(12) United States Patent
Subramaniam et al.

(10) Patent No.: US 9,632,990 B2
(45) Date of Patent: Apr. 25, 2017

(54) AUTOMATED APPROACH FOR EXTRACTING INTELLIGENCE, ENRICHING AND TRANSFORMING CONTENT

(71) Applicant: Infosys Limited, Bangalore (IN)

(72) Inventors: Jagathpathy Subramaniam, Chennai (IN); Thirumugam Madanagopal, Chennai (IN); Venkatasubramanian Santhana, Chennai (IN); Rahul Mishra, North Wales, PA (US); Biswanath Chandramouli, Chennai (IN); Saroja Raghunath, Chennai (IN); Padmavathi Sundaram, Chennai (IN); Karthick Gopalakrishnan, Chennai (IN); Anilkumar Pambalayam Narayan, Chennai (IN); Sriram Krishnan Murali, Chennai (IN)

(73) Assignee: Infosys Limited, Bangalore (IN)

( * ) Notice: Subject to any disclaimer, the term of this patent is extended or adjusted under 35 U.S.C. 154(b) by 462 days.

(21) Appl. No.: 13/945,315

(22) Filed: Jul. 18, 2013

(65) Prior Publication Data
US 2014/0026033 A1 Jan. 23, 2014
US 2016/0299878 A9 Oct. 13, 2016

(30) Foreign Application Priority Data

Jul. 19, 2012 (IN) ............................ 2947/CHE/2012

(51) Int. Cl.
*G06F 17/22* (2006.01)
*G06F 17/30* (2006.01)

(52) U.S. Cl.
CPC ........ *G06F 17/2264* (2013.01); *G06F 17/227* (2013.01); *G06F 17/2247* (2013.01); *G06F 17/3092* (2013.01)

(58) Field of Classification Search
CPC ............. G06F 17/2264; G06F 17/2282; G06F 17/2247; G06F 17/227; G06F 17/3092
USPC ........................................ 715/239, 237, 234
See application file for complete search history.

(56) References Cited

U.S. PATENT DOCUMENTS

| 7,251,777 | B1 * | 7/2007 | Valtchev et al. ............... 715/234 |
| 7,440,967 | B2 | 10/2008 | Chidlovskii |
| 7,693,848 | B2 | 4/2010 | Dejean et al. |
| 2003/0136841 | A1 * | 7/2003 | Alleshouse .............. 235/462.01 |

(Continued)

OTHER PUBLICATIONS

Exegenix, "ECS Software Components," retrieved from http://webcache.googleusercontent.com/search?q=cache:7sjJMRasu8QJ:ftp://ftp.software.ibm.com/software/data/information-agenda/A-Exegenix_ECS_Software_DM-DB2.pdf+Exegenix+Conversion+Solutions+and+services+of+printable+documents.pdf&cd=3&hl=en&ct=cInk&gl=in on Jul. 24, 2013 (2009).

(Continued)

*Primary Examiner* — Scott Baderman
*Assistant Examiner* — Seung Jung
(74) *Attorney, Agent, or Firm* — LeClairRyan, a Professional Corporation

(57) ABSTRACT

The present invention relates to a system and method for enriching and transforming unstructured data to obtain structured data by intelligence extraction, enrichment, categorization and hierarchy creation. The invention discloses an automated approach for transformation of unstructured documents, which involves an analysis, a transformation and a quality assessment of the input unstructured documents, to obtain the output structured documents in fewer time frames and without the need of skilled labors.

18 Claims, 2 Drawing Sheets

(56) References Cited

U.S. PATENT DOCUMENTS

2004/0006742 A1* 1/2004 Slocombe ............... 715/513
2006/0288275 A1   12/2006 Chidlovskii et al.
2009/0192956 A1* 7/2009 Dejean et al. ............ 706/12

OTHER PUBLICATIONS

Kapow Technologies, "A Definitive Guide to Automating Content Migration," pp. 1-12 (2009).

* cited by examiner

AUTOMATED APPROACH FOR EXTRACTING INTELLIGENCE, ENRICHING AND TRANSFORMING CONTENT

This application claims the benefit of Indian Patent Application Filing No. 2947/CHE/2012, filed Jul. 19, 2012, which is hereby incorporated by reference in its entirety.

FIELD OF INVENTION

The present invention relates generally to extracting intelligence from unstructured data and, in particular, to a system and method for enriching and transforming unstructured data by extracting intelligence from unstructured data source.

BACKGROUND OF THE INVENTION

In larger organizations and companies, contents (including legal content) are present in variety of formats, and therefore automatic content management has become a major challenge in such organizations. The transformation of various content formats, including legacy content, by extracting intelligence, enhancing the content to meet market expectations and structuring it, then, is increasingly important.

One challenge with the transformation of the unstructured data is that the level of inconsistency is very high in the unstructured data which makes structuring of such data difficult.

Another problem with such transformation is that the volume of unstructured documents to be transformed to the structured data is roughly in millions. In such case, one cannot rely on the manual process and there is a need of automation in the process of transforming unstructured documents into the structured documents.

Yet another problem with the transformation of unstructured data is that the input content may not be static in nature, which make transformation difficult.

Still another problem with the transformation of the unstructured data is to achieve the transformation within a tight business schedules requirements.

In view of forgoing discussion, there is a need to develop an automated system and method for enriching and transforming unstructured data by extracting intelligence from unstructured data source which can help in tackling large number of documents with high level of consistency on the basis of varying level of business logic which can also identify risks in early life cycle of transformation and can comprehensively identify extraction and transformation requirements of a business.

SUMMARY OF THE INVENTION

The shortcomings of the prior art are overcome and additional advantages are provided through the provision of a method and system as described in the description.

The present disclosure solves the limitations of existing techniques by providing a system and method for enriching and transforming unstructured data by extracting intelligence from unstructured data source.

In one embodiment, the disclosure provides a system for enriching and transforming unstructured data by extracting intelligence from an unstructured data source. The system may include a receiving module configured to receive at least one unstructured document and provide at least one unstructured XML file. The system may also include an analysis work bench module configured to facilitate an identification of complexity level of the at least one unstructured XML file, wherein the analyzing module further configured to facilitate a listing of a plurality of applicable and configurable transformation rules for the at least one unstructured XML file. The system may also provide an automated transformation module configured to transform the at least one unstructured XML file to a structured XML file based on the plurality of applicable and configurable transformation rules and a predefined set of target schema. The system also has a verification work bench to validate the structured XML file against the plurality of applicable and configurable transformation rules to report incorrect transformation.

The foregoing summary is illustrative and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Various embodiments of the invention will, hereinafter, be described in conjunction with the appended drawings provided to illustrate, and not to limit the invention, wherein like designations denote like elements, and in which.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Embodiments of the present disclosure provide a method and system for enriching and transforming unstructured data by extracting intelligence from unstructured data source. The system and method automates the transformation process and supports the transformation of a large number of documents with minimal or no manual efforts. It also tackles the inconsistency of the unstructured data on the basis of varying business logic.

Figure 1:
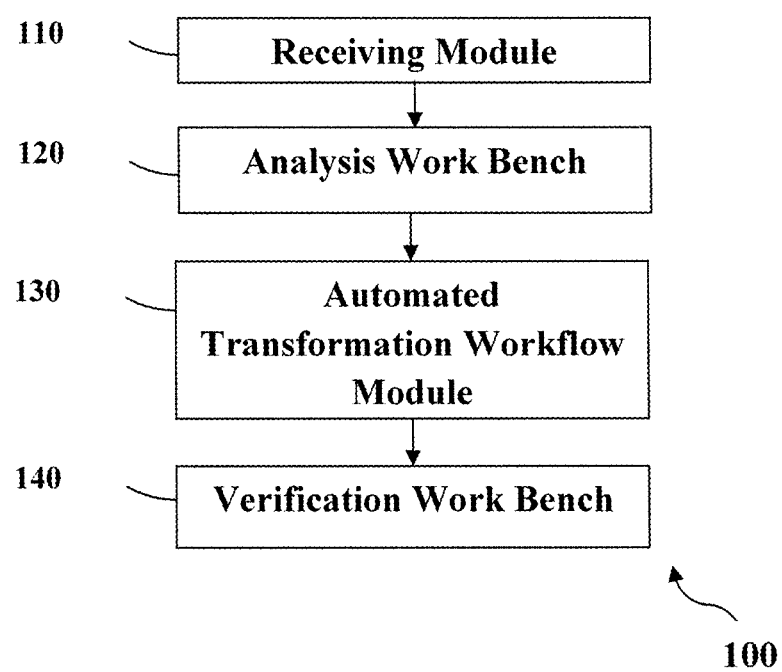
FIG. 1 depicts the steps performed for transforming input document to structured documents, in accordance with an embodiment.

FIG. 1 depicts the general process of transforming an input document to a structured document, the input documents 110 can be in various format, including XML. The major challenge in enhancing and structuring of huge volume of the unstructured documents is that data in the input documents are usually not consistent; the logical representation of data and format may vary across various files. The process of structuring an unstructured document starts with analyzing 120 the inconsistency and complexity of the input data. Once the documents are analyzed, documents are transformed through automated transformation workflow module 130 on the basis of a detailed analysis, a plurality of applicable and configurable transformation rules and a predefined set of target schema. The applicable and configurable transformation rules are the set of instructions which specify the mapping between the unstructured document content and, the elements and/or attributes of the expected structured document. Predefined set of target schemade fine a sequence, hierarchy and attributes of elements and define data types and default values for elements and attributes. Once documents are transformed, they may go through a verification work bench 140, wherein the transformed files are validated against the plurality of applicable and configurable transformation rules in order to report incorrect transformation in the final structured XML file, and thereby generate one or more structured documents, as in 214

Figure 2:
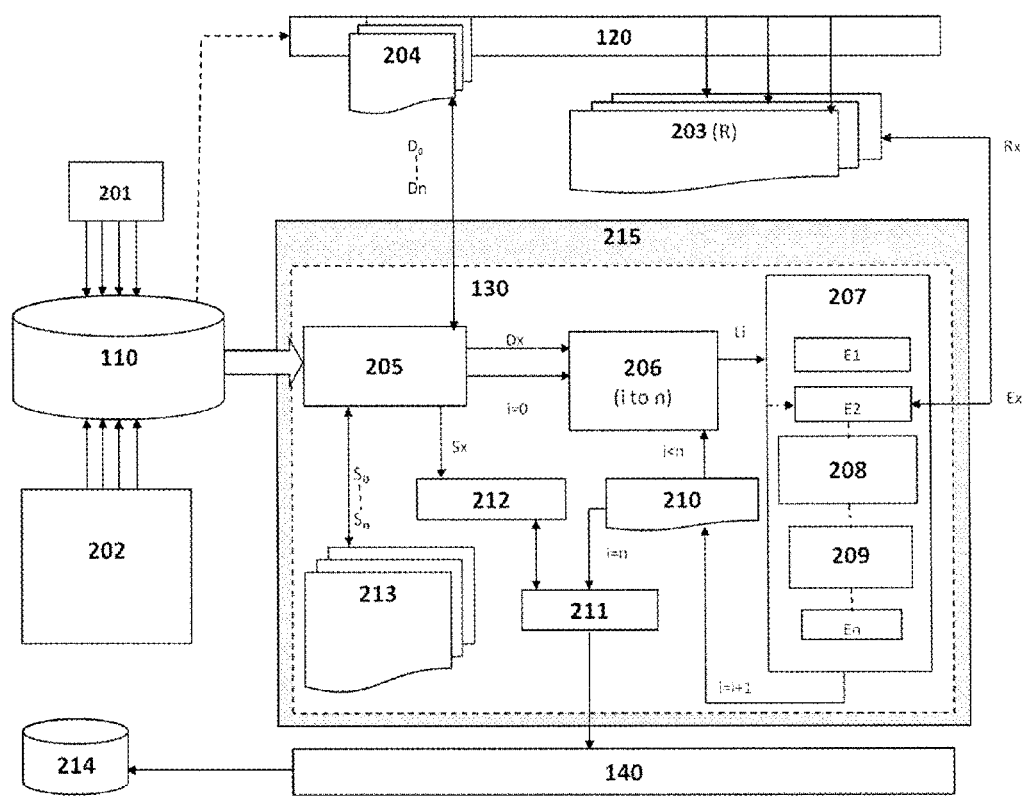
FIG. 2 illustrates the process flow to obtain structured files.

FIG. 2 illustrates the process flow to obtain structured files by extracting intelligence, enriching and transforming content from unstructured data source. The receiving module 110 receives the unstructured documents from any unstructured data source and provides an unstructured XML file. The input data may be in the form of historic content 201 or continuously updating feed 202. The historic content 201 is the old data existing in the repository and the continuously updating feed 202 is the current data or live data. The analysis work bench 120 receives the unstructured XML files from the receiving module 110 to analyze a complexity level of the unstructured XML file to identify a set of rules for converting the unstructured XML files on the basis of a predefined set of target schema 212, this step is intelligence extraction from the unstructured XML file. This work bench may also aid in sizing and planning a transformation program. The analysis work bench creates the plurality of applicable and configurable transformation rule set 203 (R0 to Rn). The Analysis work bench also comprises of a process driver 204 which regulates a transformation process particularly a level and order which form a transformation sequence based on the intelligence extracted from the unstructured XML file. The decision making engine 205 controls the transformation process based on the transformation sequence. The selection of the predefined-target schema 212 is done from a predefined set of target schema repository 213. The level processor 206 initiates the corresponding engine from the data mining engine 207 collection. The applicable and configurable transformation rules 203 are matched with the corresponding data mining engine to provide an intermediate level XML output 210. The initiation of engines from data mining engine collection and matching the applicable and configurable transformation rules with the corresponding data mining engine to provide an intermediate level XML output 210 is an iterative process. A bulk schema validation module 211 validates the structured XML file based on the predefined set of target schema 212. The verification work bench validates the structured file obtained from bulk schema validation module against the plurality of applicable and configurable transformation rules to report incorrect transformation in structured XML files. The workflow management console 215 logs, reports, regulates and manage the entire process of transformation of unstructured XML file to structured XML file.

The analysis work bench 120 comprises a pattern analysis module which generates a list of designator pattern from the plurality of unstructured files; the pattern analysis module also possesses a designator pattern module to find out the plurality of designator pattern in the plurality of unstructured XML files. The analysis work bench also comprised of a heading analysis module to extract at least a heading from the plurality of unstructured XML files. Additionally, the analysis work bench comprises a quotation analysis module to extract at least a quoted text from the plurality of unstructured files, a table of content module configured to extract at least a text of the table of content from the plurality of unstructured files, and a forms and table module to find out at least a forms and tables from the plurality unstructured XML files to obtain at least one analyzed XML file. The analysis work bench 120 provides inputs for a plurality of process drivers to set a sequence of the transformation process of the at least one unstructured XML file.

The automated transformation workflow Module 130 transforms the analyzed XML file to obtain the structured XML file which has not been undergone to verification workbench 140. Broadly, the transformation of the unstructured data from the unstructured data source may involve an intelligence extraction, enrichment, a categorization and a hierarchy creation. The automated transformation workflow module 130 comprises of a decision making engine 205 to initiate a level processor to execute the transformation process and a plurality of data mining engines 207 to perform a defined task based on the plurality of applicable and configurable rules. The automated transformation workflow module 130 further comprises of a bulk schema validation module to validate the structured XML files based on the predefined set of target schema and a continuous integration module to integrate at least a change in an automated transformation workflow code to identify at least one integration error at regular intervals of time. The various modules of the automated transformation workflow module 130 perform the transformation based on the applicable and configurable transformation rules whereas the additional module namely the bulk schema validation module is based on the predefined set of target schema. The rule set is the set of instructions which specifies the mapping between the unstructured document content and, the elements and/or attributes of the expected structured document. Hence according to the type of the document; different rules are applicable to different types of documents. The data mining engine collection 207 comprised of a pattern identifier module, a hierarchy builder module, a pattern aided locator module, a heading mark up module, a quotation mark up module, a table of content mark up module, a forms and tables mark up module. The pattern identifier module marks up at least one designator and at least a title in the plurality of analyzed XML files. The hierarchy builder module builds a hierarchy in the plurality of analyzed XML files. The pattern aided locator module marks up the at least one pattern identified by the pattern analysis module. The Heading mark up module marks up the at least one heading identified by the heading analysis module. The quotation mark up module marks up at least one quotation identified by the quotation analysis module. The table of content mark up module configured to parse and mark up the at least one table of content identified by the Table of Content Module. The forms and tables mark up module mark up the at least one forms and a tables in the plurality of analyzed XML files identified by the forms and tables module.

The modules of the automated transformation workflow module 130 involved in the intelligence extraction process are the pattern identifier module, the hierarchy builder module, the pattern aided locator module and the quotation mark up module. Similarly, the modules involve in the enrichment of unstructured data are, the pattern identifier module, the hierarchy builder module, the pattern aided locator module, the heading mark up module, the quotation mark up module, the table of content mark up module and the forms and tables mark up module. The modules involve in the categorization of the unstructured data are, the pattern aided locator module, the heading mark up module, the quotation mark up module and the forms and tables mark up module. The hierarchy builder module creates the hierarchy in the plurality of the analyzed XML files.

The verification work bench 140 ensure the quality of the transformation wherein it comprises a content drop and repetition identifier module, a regression testing module, a direct mapping validator module and a hierarchy compare module. The content drop and repetition identifier module identifies a dropped and a repeated content in at least one structured file. The regression testing module compares at least a plurality of versions of an XML file from the plurality of structured XML files. The direct mapping validator module creates a list of defective mapping by scanning and comparing the unstructured XML files and the transformed structured files. The hierarchy compare module scan and compare the unstructured files and the structured files, to identify at least one hierarchy mismatch.

While the various embodiments of the invention have been illustrated and described, it will be clear that the invention is not limited only to these embodiments. Numerous modifications, changes, variations, substitutions, and equivalents will be apparent to those skilled in the art, without departing from the spirit and scope of the invention.

We claim:

1. A content management computing device, comprising:
a memory; and
a processor operatively coupled to the memory, the processor configured to perform the steps comprising:
providing an unstructured XML file based on an unstructured document;
extracting a heading, a quoted text, a text of a table of contents, and a form and table from the unstructured XML file;
determining a complexity level of the unstructured XML file based on the extracted heading, quoted text, text of the table of contents, and form and table from the unstructured XML file;
generating a plurality of applicable and configurable transformation rules for the unstructured XML file based on the complexity level;
transforming the unstructured XML file to a structured XML file based on the plurality of applicable and configurable transformation rules and a predefined set of target schema; and
validating the structured XML file against the plurality of applicable and configurable transformation rules to report incorrect transformation in the structured XML file, wherein the validating comprises identifying dropped content and repeated content from the unstructured XML to the transformed structured XML file, creating a list of defective mapping between the unstructured XML file and the structured XML file, and identifying a hierarchy mismatch between the unstructured XML file and the structured XML file.

2. The device as set forth in claim 1 wherein the processor is further configured to execute programmed instructions stored in the memory comprising:
providing a listing of a plurality of process drivers that sets a sequence of a transformation process of the unstructured XML file.

3. The device as set forth in claim 1, wherein the processor is further configured to execute programmed instructions stored in the memory comprising:
validating the structured XML file based on the predefined set of target schema; and
integrating a change in an automated transformation workflow to identify an integration error at regular intervals of time.

4. The device as set forth in claim 1, wherein the processor is further configured to execute programmed instructions stored in the memory comprising:
marking up a designator and a title, a pattern, a heading, a quotation, a table of content, a form and a table in the unstructured XML file; and
building a hierarchy in the unstructured XML file.

5. The device as set forth in claim 1, wherein the plurality of applicable and configurable transformation rules are a set of instructions that specify a mapping between a content of the unstructured document and elements and attributes of an expected structured document.

6. The device as set forth in claim 1, wherein the predefined set of target schema define a sequence, a hierarchy and attributes of elements, and data types and default values for the elements and attributes.

7. A non-transitory computer readable medium having stored thereon instructions for extracting intelligence, enriching, and transforming content comprising machine executable code, which when executed by a processor, causes the processor to perform steps comprising:
providing an unstructured XML file based on an unstructured document;
extracting a heading, a quoted text, a text of a table of contents, and a form and table from the unstructured XML file;
determining a complexity level of the unstructured XML file based on the extracted heading, quoted text, text of the table of contents, and form and table from the unstructured XML file;
generating a plurality of applicable and configurable transformation rules for the unstructured XML file based on the complexity level;
transforming the unstructured XML file to a structured XML file based on the plurality of applicable and configurable transformation rules a predefined set of target schema; and
validating the structured XML file against the plurality of applicable and configurable transformation rules to report incorrect transformation in the structured XML file, wherein the validating comprises identifying dropped content and repeated content from the unstructured XML to the transformed structured XML file, creating a list of defective mapping between the unstructured XML file and the structured XML file, and identifying a hierarchy mismatch between the unstructured XML file and the structured XML file.

8. The medium as set forth in claim 7, further having stored thereon at least one additional instruction that when executed by the processor causes the processor to perform at least one additional step comprising:

providing a listing of a plurality of process drivers that sets a sequence of a transformation process of the unstructured XML file.

9. The medium as set forth in claim 7, further having stored thereon at least one additional instruction that when executed by the processor causes the processor to perform at least one additional step comprising:

validating the structured XML file based on the predefined set of target schema; and integrating a change in an automated transformation workflow, to identify an integration error at regular intervals of time.

10. The medium as set forth in claim 7, further having stored thereon at least one additional instruction that when executed by the processor causes the processor to perform at least one additional step comprising:

marking up a designator and a title, a pattern, a heading, a quotation, a table of content, a form and a table in the unstructured XML file; and building a hierarchy in the unstructured XML file.

11. The medium as set forth in claim 7, wherein the plurality of applicable and configurable transformation rules are a set of instructions that specify a mapping between a content of the unstructured document and elements and attributes of an expected structured document.

12. The medium as set forth in claim 7, wherein the predefined set of target schema define a sequence, a hierarchy and attributes of elements, and data types and default values for the elements and attributes.

13. A method for extracting intelligence, enriching, and transforming content implemented by a computing device comprising:

providing an unstructured XML file based on an unstructured document;

extracting a heading, a quoted text, a text of a table of contents, and a form and table from the unstructured XML file;

determining a complexity level of the unstructured XML file based on the extracted heading, quoted text, text of the table of contents, and form and table from the unstructured XML file;

generating a plurality of applicable and configurable transformation rules for the unstructured XML file based on the complexity level;

transforming the unstructured XML file to a structured XML file based on the plurality of applicable and configurable transformation rules and a predefined set of target schema; and validating the structured XML file against the plurality of applicable and configurable transformation rules to report incorrect transformation in the structured XML file, wherein the validating comprises identifying dropped content and repeated content from the unstructured XML to the transformed structured XML file, creating a list of defective mapping between the unstructured XML file and the structured XML file, and identifying a hierarchy mismatch between the unstructured XML file and the structured XML file.

14. The method as set forth in claim 13, further comprising:

marking up a designator and a title, a pattern, a heading, a quotation, a table of content, a form and a table in the unstructured XML file; and building a hierarchy in the unstructured XML file.

15. The method as set forth in claim 13 further comprising:

providing a listing of a plurality of process drivers that sets a sequence of a transformation process of the unstructured XML file.

16. The method as set forth in claim 13 further comprising:

validating the structured XML file based on the predefined set of target schema; and integrating a change in an automated transformation workflow to identify an integration error at regular intervals of time.

17. The method as set forth in claim 13, wherein the plurality of applicable and configurable transformation rules are a set of instructions that specify a mapping between a content of the unstructured document and elements and attributes of an expected structured document.

18. The method as set forth in claim 13, wherein the predefined set of target schema define a sequence, a hierarchy and attributes of elements, and data types and default values for the elements and attributes.

* * * * *